UNITED STATES PATENT OFFICE.

LOUIS BROWN, OF NEW YORK, ASSIGNOR OF THREE-FOURTHS TO LUCY NICHOLS WHITE, OF RYE, N. Y.

PAINT.

SPECIFICATION forming part of Letters Patent No. 298,941, dated May 20, 1884.

Application filed June 2, 1883. (Specimens.)

*To all whom it may concern:*

Be it known that I, LOUIS BROWN, of New York, in the county of New York and State of New York, a citizen of the United States, have invented a new and useful Improvement in Paints, of which the following is a full, clear, and exact description.

In the process of distilling zinc there is deposited in the pipes or tubes leading from the retorts a zinc powder or dust of exceeding fineness, which is not zinc-white or an oxide of zinc, and which I name "sublimed zinc," in contradistinction to flowers of zinc, zinc-white, or zinc in any other form. This dust is sometimes known as "zinc-blue powder," or "zinc-dust," and it has never so far as I am aware been used in the manufacture of paint. After being deposited in the condenser-tubes connected with the retorts, it is recharged in the retorts and comes out in metallic form at the next heat. I have discovered that paints containing this powder have a number of advantages over other metallic paints or paints of that character, and especially that they have much more body than any other; and much greater preservative qualities against the action or influence of either salt-air or salt-water, and are much more economical, on account of requiring but one coat where of other paints two are always necessary.

In making the paint, I vary the proportions of the zinc powder or dust to the remainder of the ingredients, according to the use for which it is intended, and I may use it in paints as a substitute for white lead or zinc-white or zinc in any other form as now used; or it may be used in combination with either of these pigments or bases.

To make a drab paint for vessels, I use four parts of whiting, eight parts of this zinc powder or dust, and four parts of white lead. The whiting, powder, and lead are intimately mixed and ground together and incorporated with suitable oil, turpentine, and drier in the ordinary way.

A fine olive green is made by using four parts of whiting, eight parts of the zinc powder or dust, and four parts of red ocher. These are intimately mixed by grinding and incorporated with a proper vehicle and drier in the ordinary way.

A brown color, suitable for iron-work, is produced by using eight parts of whiting, four parts of zinc powder or dust, and four parts of red and black ocher.

The process of making this paint is like that of the others.

It will also be observed that the above-mentioned solid ingredients of the paints—such as white lead, whiting, red ocher, black ocher—are all substances which unite similarly with the vehicle, and are as paint bodies the substantial equivalents of each other, except as they affect the color of the paint, and they may be used indifferently as auxiliary bodies to the zinc sublimate, the choice of the workman among them or other known constituents of the paint being governed by the color desired. These proportions may be varied for different kinds of work and to obtain different shades.

I do not confine myself to the proportions herein indicated; neither do I confine myself to the proportions of zinc powder or dust used in making the paint, but would state that as a general rule from one-sixth ($\frac{1}{6}$) to two-thirds ($\frac{2}{3}$) of the base of the paint may be of this zinc powder or dust.

The advantages of the use of this powder in paints have already been stated.

Having thus fully described my invention, I claim and desire to secure by Letters Patent of the United States—

A paint made of sublimated-zinc powder, of the character herein specified, combined with whiting or other suitable coloring or filling matter and a vehicle.

LOUIS BROWN.

In presence of—
JOHN A. ROEBUCK,
HENRY POWELL.